United States Patent [19] [11] 4,098,597
Nebelung [45] Jul. 4, 1978

[54] ROTARY SNUBBER FOR LINEAR ACTUATOR

[75] Inventor: Hermann Nebelung, Zurich, Switzerland

[73] Assignee: Emhart Industries, Inc., Hartford, Conn.

[21] Appl. No.: 778,672

[22] Filed: Mar. 17, 1977

[51] Int. Cl.² ............................................. C03B 9/40
[52] U.S. Cl. ........................................ 65/181; 65/229; 65/234; 188/306
[58] Field of Search ............... 188/306, 307, 308, 309, 188/310, 287; 16/58; 65/181, 229, 234

[56] References Cited

U.S. PATENT DOCUMENTS

| 1,170,758 | 2/1916 | Kilgour | 188/287 |
| 1,821,787 | 9/1931 | Black | 188/287 X |
| 2,032,289 | 2/1936 | Lacroix | 188/287 |
| 2,070,409 | 2/1937 | Mitchell | 188/306 X |
| 2,197,925 | 4/1940 | Davis | 188/306 X |
| 2,314,493 | 3/1943 | Guy | 188/306 |
| 3,147,105 | 9/1964 | Abbott et al. | 65/181 X |
| 3,419,114 | 12/1968 | Rumsey | 188/306 X |
| 3,512,803 | 5/1970 | Hines et al. | 188/310 X |

FOREIGN PATENT DOCUMENTS

| 425,979 | 2/1911 | France | 188/306 |
| A20,473 | 11/1917 | France | 188/306 |

Primary Examiner—George E. A. Halvosa
Attorney, Agent, or Firm—McCormick, Paulding & Huber

[57] ABSTRACT

Two rotary snubbers are shown, one having two movable vanes which force oil through two sets of successively closed openings in a stationary ring to achieve the snubbing force, and another version having one stationary vane and movable ring with the snubbing force nevertheless achieved in both directions with the two sets of openings defined in the ring.

5 Claims, 6 Drawing Figures

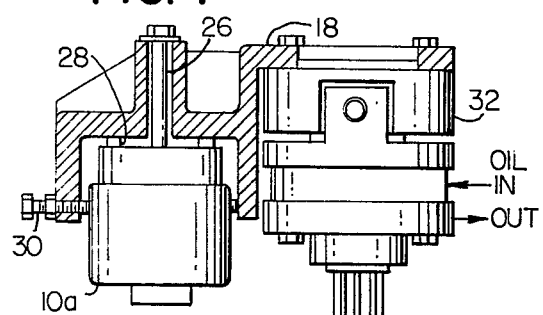
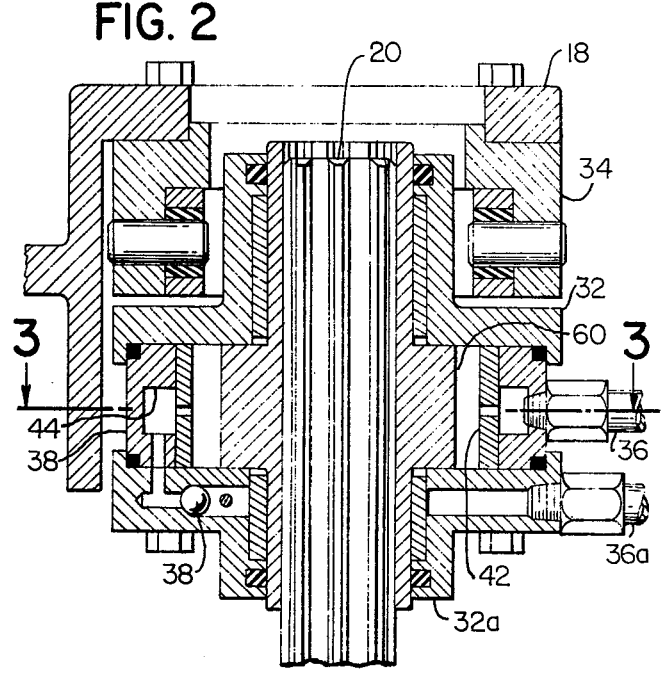
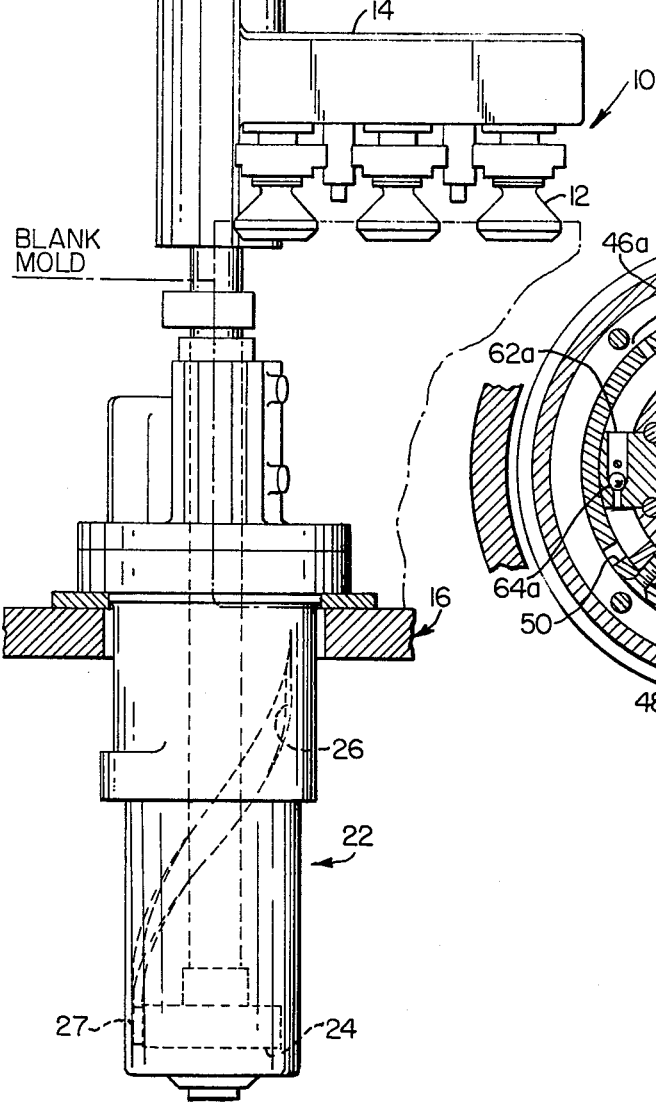
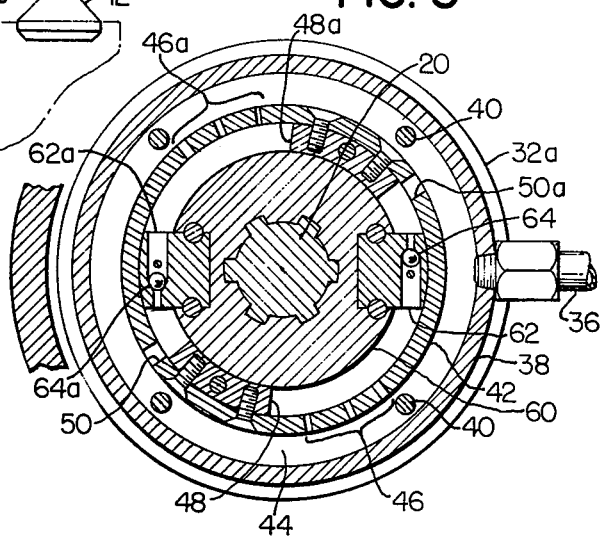

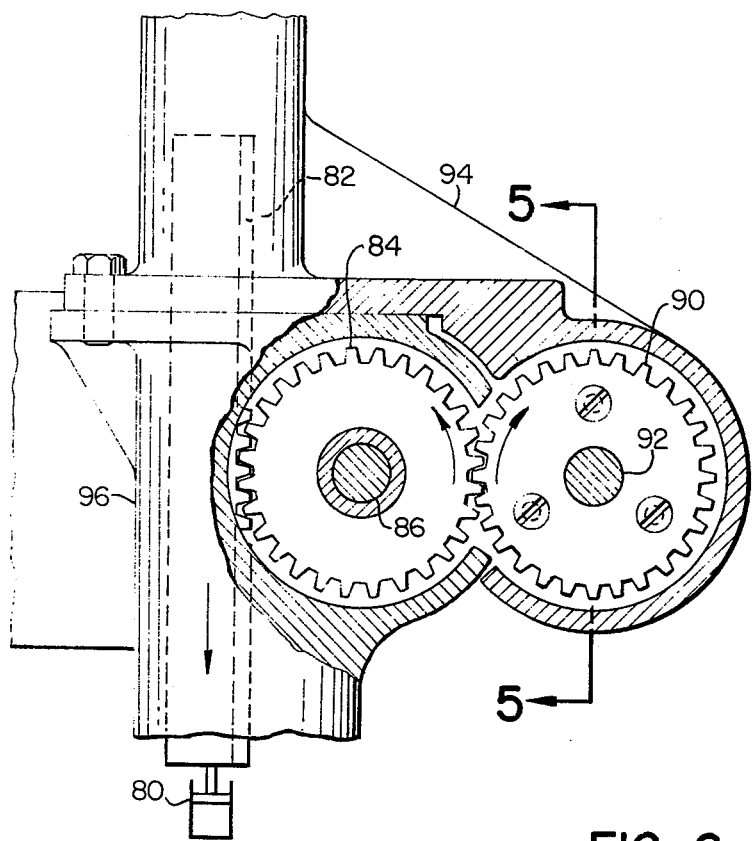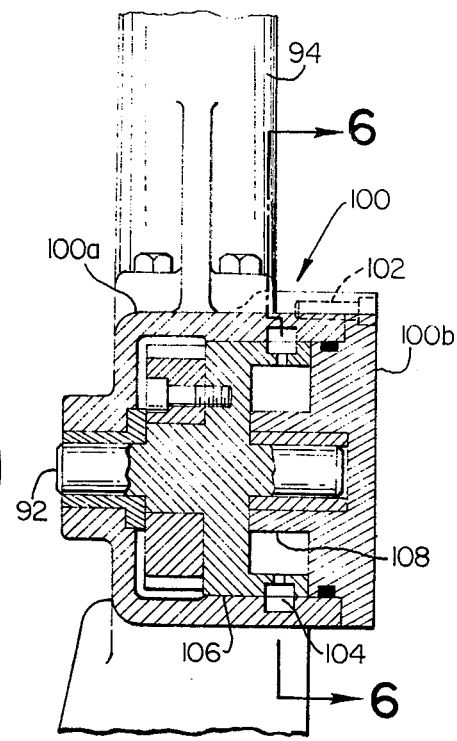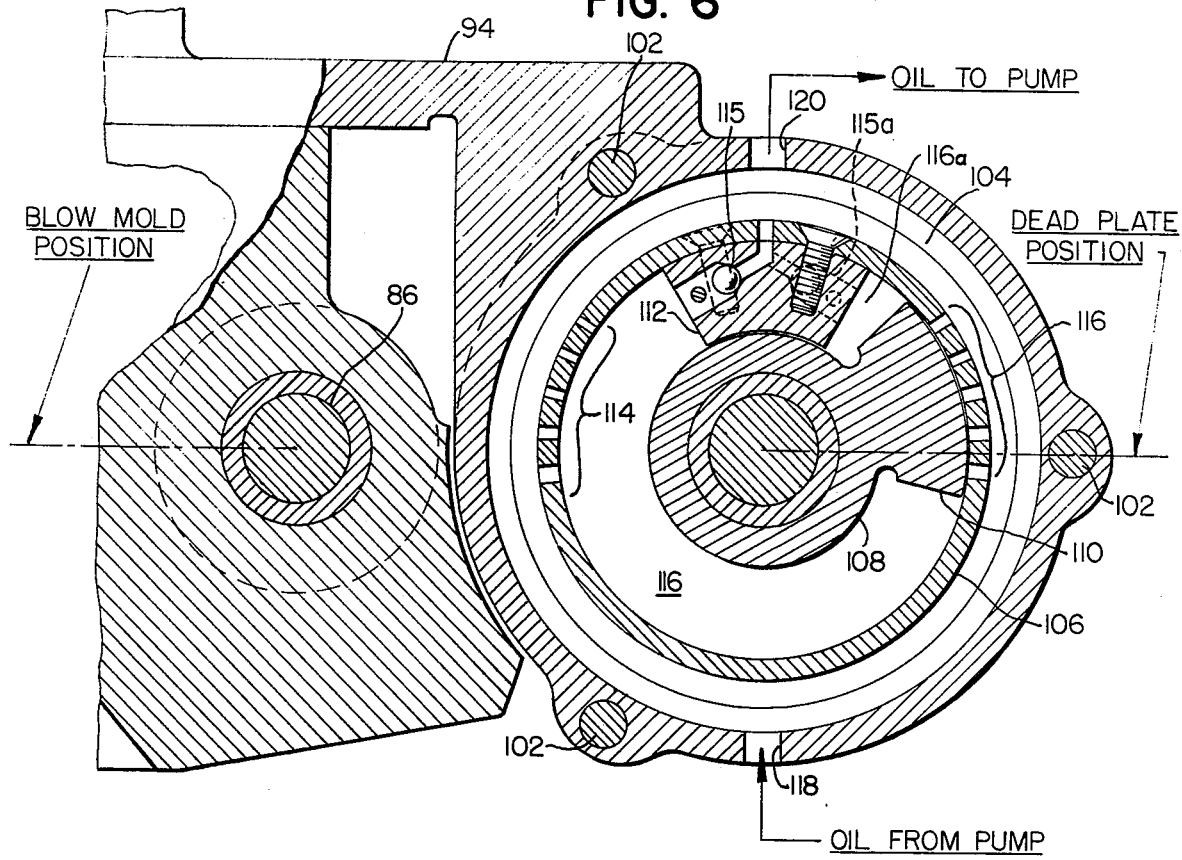

ROTARY SNUBBER FOR LINEAR ACTUATOR

BACKGROUND OF INVENTION

In a glassware forming machine of I.S. type several components in each section are pneumatically operated and are mechanically connected to their respective linear actuators to achieve oscillatory motion of the component itself. Such components in a typical machine are; the "take-out" mechanism, which has tongs for lifting the newly formed ware from the final blow station to deposit them on a deadplate for transfer to a take away conveyor or the like; the "blowhead" or "baffle" which moves down onto the blank mold at the blank station after the gobs of molten glass have been delivered thereto to mate with the upwardly open blank mold cavities; the funnel mechanism which guides the gobs as they are dropped into these blank mold cavities; and the invert mechanism which moves the partially formed blanks or parisons from the blank station to a succeeding machine station for further forming.

Other examples might be listed for I.S. machine components which involve at least some oscillatory motion, and which are operated pneumatically from a linearly reciprocable actuator. With the demand for increased production rates in such machines, particularly in machines designed to handle "triple gobbing", the need for avoiding any abrupt starting and/or stopping of these components has become more apparent.

Prior art approaches have generally taken the form of decelerating the piston of the linear air actuator near the end of its stroke, U.S. Pat. No. 3,150,562 is an example of this solution. Still with reference to solving the problem by restricting the rate of flow of the compressible fluid itself, the recently issued U.S. Pat. No. 3,921,504 shows a similar solution, wherein the disadvantages of relying upon the air in the actuator itself are even more apparent.

Hydraulic snubbers have also been used in hydraulically operated actuators of the linear type, and U.S. Pat. No. 2,991,759 is an example of such a cushioning device, but in the I.S. machine environment the use of hydraulic snubbers to snub motion of a pneumatically operated machine component has usually taken the form of that shown in U.S. Pat. No. 3,147,105. These prior art hydraulic snubbers usually provide a constant snubbing force on the air driven component, unless a lost motion device is provided for rendering them less effective during a portion of their angular travel.

The chief aim of the present invention is to provide a self contained snubber, without external needle valves or the like, which snubber provides an ever increasing snubbing force toward the end of the mechanical motion, and which will operate in both directions if desired, or in an alternative embodiment will provide supplemental snubbing in one direction only.

SUMMARY OF INVENTION

An I.S. machine component, such as a "take-out" or "baffle/blowhead" mechanism is pneumatically operated, but snubbed hydraulically at least in an oscillatory mode, by a stationary snubber having a movable internal part connected to the shaft of the machine component being oscillated. An annular chamber is provided with oil at sufficient pressure to keep the snubber filled, and a guide ring has at least two sets of circumaxially spaced openings which are successively closed to force oil radially outwardly from an internal oil filled chamber of progressively reduced volume into the annular chamber. At least one vane on the movable inner snubber part pushes the oil through these openings, and at least one inwardly projecting fixed abutment defined by the guide ring cooperates with the vane for this purpose.

Passageway means, and one way check valves in the passageways, are provided in association with the abutments and vanes to provide for return flow of the oil behind the moving vane.

BRIEF DESCRIPTION OF DRAWINGS

FIG. 1 illustrates in elevation the installation of a snubber at the upper splined end of a reciprocable and oscillatory baffle mechanism at the blank station of an I.S. machine.

FIG. 2 is a vertical sectional view of the snubber illustrated in FIG. 1, but drawn to a somewhat larger scale.

FIG. 3 is a horizontal sectional view taken on the line 3—3 of FIG. 2.

FIG. 4 illustrates in elevation the gearing used to connect an alternative snubber construction to a take-out mechanism at the blow station of a typical I.S. machine.

FIG. 5 is a vertical sectional view taken on line 5—5 through the snubber of FIG. 4.

FIG. 6 is a vertical sectional view taken on line 6—6 of FIG. 5.

DETAILED DESCRIPTION

FIG. 1 shows a baffle mechanism 10 in a typical I.S. machine of the type disclosed in the Ingle U.S. Pat. No. 1,911,119. However, the three baffles 12, 12 are adapted to mate with three upwardly open blank molds shown in phantom lines rather than being of the "single gob" type machine disclosed in Ingle. The arm 14 of the baffle mechanism is thus much longer, and heavier, than that shown in Ingle, with the result that the inertia forces now encountered tend to exert an acceptable reaction forces on the fixed frame 16. The provision of an upper support 18 for the shaft 20 of the actuator 22 has helped in absorbing these inertia forces, but the oscillatory motion of the arm 14 about the axis of shaft 20 tends to cause undesirable noise and deflections of the machine frame 16 and support beam 10a.

The actuator 22 is of conventional construction having a piston 24 connected to the shaft 20, and a fixed slotted cam 26 engaging a cam follower 27 for rotating the shaft 20 through approximately 60° as the baffle 10 moves up and down from and to the position shown. The swinging, horizontal oscillatory motion of the baffle 10 is necessary so that a similarly movable funnel mechanism (not shown) can move into contact with the blank mold and so that the gobs can drop downwardly into these funnels, all in timed relationship to one another during the machine cycle.

The upper support 18 for the shaft 20 is adjustably mounted to the beam 10a for both vertical adjustment, by means of the screw 26 and shims 28, and horizontally, by means of the screws 30. A rotary snubber 32, of FIGS. 2 and 3, is provided in support 18, being pinned in place by the annular collar 34. The snubber 32 has a fixed housing and oil lines 36 and 36a for providing the incompressible fluid to the interior of the snubber, past a one way check valve 38.

The snubber 32 is adapted to snub oscillatory motion of the shaft 20 in at least one direction (e.g. in motion of the baffles 12, 12 downwardly as they contact the blank mold) by means of the structure to be described. Return motion of the shaft 20, to stow the baffle during its inactive phase need not necessarily be snubbed and the snubber version to be described thus allows for a speed up of the "swing out" motion of the baffle, and improves the overall speed of operation of the machine.

The snubber 32 includes the fixed, universally mounted housing mentioned above, and having the oil lines 36 and 36a connected thereto. More particularly, this fixed housing includes upper and lower segments 32 and 32a with an annular chamber defining shell 38 clamped therebetween by screws 40, 40 best shown in FIG. 3. An annular ring, or guide member 42, cooperates with the shell 38 to define an annular chamber 44 supplied with snubber oil through the line 36. This oil can be circulated through check valve 38 back to a pump (not shown) via line 36a.

The annular guide member 42 has two sets of circumaxially spaced openings defined therein, and best shown in FIG. 3 at 46 and 46a. Two abutments 48 and 48a are mounted to the inside of ring member 42 by screws or the like and the guide member may have ports, 50 and 50a, for replenishing the space behind a rotating vane, to be described, with snubber oil.

The snubber of FIGS. 2 and 3 also includes an inner part 60 rotatably received in the fixed upper and lower housing portions, 32 and 32a respectively, and movable with respect to the guide ring 42 in response to oscillatory motion of the shaft 20. Preferably, the shaft 20 is splined as shown in FIG. 3 to receive the complementary shaped inner part 60, and the latter slidably receives the shaft 20 as shown in FIG. 2, but oscillates in association therewith.

The inner movable part 60 has vanes 62 and 62a associated with the abutments, 48 and 48a respectively, to define inner chambers, the oil filled contents of which chambers are forced radially outwardly through the openings 46 and 46a respectively, as the inner snubber part moves clockwise in FIG. 3 from the position shown through the travel (approximately 60°) of the splined shaft 20. As this snubbing motion is being achieved the openings 46 and 46a are successively closed, causing the snubbing force to increase toward the limit of travel in the clockwise direction. Additionally, these openings, 46 and 46a, are of progressively reduced diameter, further increasing the snubbing force achieved.

The enlarged volumes of the regions behind the vanes 62 and 62a during the above described motion will be replenished with oil from the annular chamber 44 by means of the ports 50 and 50a. These ports are considerably larger than even the combined cross sectional area of the sized openings, 46 and 46a respectively, to avoid cavitation of the snubber oil.

During return movement of the inner snubber part 60 no snubbing action is desired, for the reasons mentioned above, and one way check valves 64 and 64a are provided in each of the vanes, 62 and 62a respectively, to provide for the desired high speed "swing out" motion of the baffle.

Turning next to a detailed description of the snubber shown in FIGS. 4–6, it should be noted that snubbing in both directions is desired in the "take-out" mechanism involved here. Also, no reciprocating motion of a linear actuator need be accommodated, and the pneumatic actuator indicated schematically in FIG. 4 at 80 moves a rack gear 82 up and down to rotate a pinion 84 through approximately 180° as suggested in FIG. 6, [e.g. between the "blow mold position" wherein the tongs (not shown) are adapted to close on the necks of the newly formed ware at the final forming or blow station, and the "deadplate position" wherein these tongs have swung the newly formed ware over the deadplate for cooling and for transfer to the take away convenyor].

The pinion 84 on shaft 86 rotates with the transfer arm (not shown) for achieving the above described motion in conventional fashion, and the reader is again referred to the Ingle U.S. Pat. No. 1,911,119 for a more complete description of this conventional structure.

In accordance with the present invention, a second pinion 90 meshes with the pinion 84 on transfer arm shaft 86, and turns a stub shaft 92 through an equal but opposite angular displacement. This stub shaft 92 is journalled in a bracket 94 mounted to the housing 96 for the take-out cylinder, and said bracket also supports a snubber 100 associated with the stub shaft 92.

This snubber 100, like that described above with reference to FIGS. 1-3, is adapted to snub oscillatory motion of an I. S. macine component in at least one direction. The snubber 100 of FIGS. 5 and 6 includes housing parts 100a and 100b held together by screws 102, 102 and defining an annular chamber 104 in cooperation with an annular ring member 106. An inner snubber part 108 cooperates with the annular ring member 106 so that relative motion of a vane 110 defined on the former occurs with respect to a radially inwardly projecting abutment 112 on the latter to force oil radially outwardly through at least two sets of openings 114 and 116 as the snubber operates in association with reciprocation of pneumatic actuator 80.

Actually, the openings 114 and 116 are so arranged with respect to the single vane 110 and single abutment 112 that snubbing is achieved in both directions, and in the snubber 100 ring 106 rotates in the housing 100a with vane 110 being stationary. In both snubber versions disclosed herein, relative motion between the vane defining inner part, and the annular ring with its abutment, is the important feature.

The abutment 112 of the FIG. 6 snubber 100 has passageway means for replenishing oil to the space created between it and the vane 110 during return motion of the snubber, and two such passageways are provided for return motion in both directions. Each passageway has a one way check valve 115 (and 115a) associated therewith to provide the oil selectively from the annular chamber 104 to the inner chambers, 116 and 116a, during the return motion for each of the two sets of openings 114 and 116. As in the previously described embodiment oil is fed into the annular chamber 104 through an inlet port 118 and returned to a pump through outlet port 120.

I claim:

1. In a glassware forming machine having an air driven actuator which includes a linearly reciprocable shaft, and cam means associated with said shaft for rotating it through a predetermined angular displacement as the shaft moves linearly for moving a component of the machine between an active position and an inactive position spaced linearly and angularly therefrom, the improvement comprising an hydraulic snubber for the angular motion, said snubber having a first housing part defining an annular chamber which is provided with hydraulic fluid, means for mounting said housing part to the fixed frame of the machine, an annular guide member defining two sets of circumaxially spaced openings so arranged that all of said openings are in communication with said annular chamber, an inner part rotatably received in said guide member and rotated directly by angular displacement of said shaft, said inner part having at least two vanes cooperating with said guide member to define at least two inner chambers, said guide member having two abutments cooperating with said vanes to force the hydraulic fluid outwardly through said two sets of openings, said vanes defining passageway means to provide for the free flow of fluid into the space behind the vanes during angular motion in one direction, and one way ball check valves in said passageway means to provide for snubbed angular motion in the other direction.

2. The combination defined by claim 1 wherein said inner part is rotated by angular displacement of said shaft as a result of said shaft having a non-circular cross section for that portion of its length which engages said inner part during linear motion thereof, and said inner part having a central opening also of non-circular cross sectional shape to cooperate with said shaft to be rotated thereby.

3. The combination defied by claim 2 further characterized by means for pressurizing the liquid in said annular chamber to a predetermined pressure and to maintain the volume of liquid therein at a predetermined level.

4. The combination defined by claim 2 wherein said two sets of circumaxially spaced openings are of progressively reduced cross sectional size around said guide member to enhance the snubbing of said anular motion near the end of the travel of said component in said other direction.

5. The combination defined by claim 2 wherein said means for mounting said housing part to the machine frame comprises a universal mounting means which permits adjustments to be made to the location of said housing part to align its inner part with said shaft.

* * * * *